United States Patent [19]

Wouters et al.

[11] Patent Number: 5,284,891

[45] Date of Patent: * Feb. 8, 1994

[54] TACKIFIERS AND THEIR USE IN PRESSURE SENSITIVE ADHESIVES

[75] Inventors: Guy Wouters, Brussels; Lutz E. Jacob, Wezembeek-Oppem, both of Belgium

[73] Assignee: Exxon Research & Engg., Linden, N.J.

[*] Notice: The portion of the term of this patent subsequent to Nov. 18, 2003 has been disclaimed.

[21] Appl. No.: 744,980

[22] Filed: Aug. 14, 1991

Related U.S. Application Data

[63] Continuation of Ser. No. 407,681, Sep. 14, 1989, abandoned, which is a continuation of Ser. No. 58,652, May 21, 1987, abandoned, which is a continuation of Ser. No. 843,909, Mar. 25, 1986, abandoned.

[30] Foreign Application Priority Data

Mar. 25, 1985 [GB] United Kingdom ............... 8507679

[51] Int. Cl.$^5$ ............... C09J 133/04; C09J 125/08; C08L 33/04; C08L 25/08
[52] U.S. Cl. ............... 524/522; 524/523; 525/221; 525/227; 525/230
[58] Field of Search ............... 525/221, 227; 524/522, 524/523

[56] References Cited

U.S. PATENT DOCUMENTS

| | | |
|---|---|---|
| 3,875,095 | 4/1975 | Yamada et al. |
| 3,929,747 | 12/1975 | Kudo et al. |
| 3,931,125 | 1/1976 | Katayama et al. |
| 3,966,661 | 6/1976 | Feast et al. ............... 524/745 |
| 4,038,474 | 7/1977 | Kudo et al. |
| 4,068,062 | 1/1978 | Lepert et al. |
| 4,078,132 | 3/1978 | Lepert et al. |
| 4,623,698 | 11/1986 | Jacob et al. ............... 525/237 |
| 4,766,169 | 8/1988 | Lepert et al. |
| 4,824,921 | 4/1989 | Luvinh. |

*Primary Examiner*—Carman J. Seccuro, Jr.
*Attorney, Agent, or Firm*—J. F. Hunt; T. D. Simmons; D. W. Miller

[57] ABSTRACT

Resins having a softening point from 10° C. to 120° C. especially 10° C. to 80° C. being a copolymer of a feed which is predominantly $C_5$ olefines and diolefines and 10 to 60 wt. % of one or more monovinyl aromatic compounds are used as a tackifier for acrylic polymers or copolymers particularly in aqueous based pressure sensitive adhesives.

4 Claims, 6 Drawing Sheets

ADHESIVE CONTAINING RESIN AND ACRONAL 85 D

PEEL STRENGTH

RESIN USED
- RESIN OF EXAMPLE 2
△ RESIN OF EXAMPLE 4
★ SNOWTACK 52 CF

ADHESIVE CONTAINING RESIN AN ACRONAL V205

SHEAR

RESIN USED

- ● RESIN OF EXAMPLE 2
- △ RESIN OF EXAMPLE 4
- ✦ SNOWTACK 52 CF

TACKIFIERS AND THEIR USE IN PRESSURE SENSITIVE ADHESIVES

This is a continuation of application Ser. No. 07/407,681, filed Sept. 14, 1989, which is a continuation of application Ser. No. 07/058,652 filed May 21, 1987, which is a continuation of application Ser. No. 06/843,909 filed Mar. 25, 1986, all now abandoned.

BACKGROUND OF THE INVENTION

The present invention relates to pressure sensitive adhesives comprising a synthetic latex and a tackifier resin.

Pressure sensitive adhesives are, among other applications, used in the tape and label field. A pressure sensitive adhesive may be used in a number of applications such as masking tape, electrical tape and medicinal tapes for holding dressings and the like in place. The term label covers an broad range of products and includes items such as price tags in the supermarket and labels on glass or plastic containers. In the case of "labels" two types of bonding are required namely permanent and removable. Permanent bonding is required for items such as labels on glass or plastic containers when the life of the label will be relatively long. Removable bonding is desirable for items such as price tags and peelable tape.

Pressure sensitive adhesives should have a high initial tack so that the adhesive surface merely needs to be contacted and pressed to a substrate to achieve bonding. There should be little or no requirement to hold the adhesive and substrate in position for any significant time while a bond develops. Depending upon the strength of adhesion required the bonding force of the adhesive may increase with time to provide a relatively permanent bond.

It is known to prepare at least three different types of adhesives using natural or synthetic tackifier, natural or synthetic resins, or blends thereof, namely, hot melt adhesives, solution adhesives and aqueous based adhesives. Hot melt adhesives are made from a blend of resins and are normally solid at room temperature. Hot melt adhesives require an elevated temperature for application to a substrate necessitating some type of hot melt gun.

Solution adhesives such as those described in U.S. Pat. Nos. 4,037,016, 4,048,124 and 4,248,748 do not suffer from the same drawback since the adhesives comprise a solution of a tackifier resin or a blend of tackifier resins in a low boiling hydrocarbon solvent. When the adhesive is applied to a substrate the solvent evaporates. Due to environmental concerns and the rising cost of hydrocarbon solvent there has been an increasing need to reduce or eliminate the hydrocarbon solvent in such adhesives. Accordingly, the adhesives industry is seeking improved aqueous based adhesive compositions. Existing aqueous based adhesive compositions usually comprise a natural or a synthetic latex in admixture with cellulose materials such as starch or natural or synthetic tackifier resins.

U.S. Pat. No. 4,189,419 to Avery International disclosed a pressure sensitive adhesive comprising from about 50 to 60% by weight on a dry basis of a tackifier and from about 50 to 40% by weight on a dry basis of a carboxylated styrene butadiene polymer (SBR).

A paper entitled "Styrene Butadiene Latexes for Adhesive Applications" by Robert G. Kahn of Dow Chemical, published in Adhesives Age, December of 1977 discloses a similar pressure sensitive adhesive composition which also contains butyl benzyl phthalate, as a "plasticizer". While the amount of plasticizer is relatively small the plasticizer comprises a hydrocarbon phase in the adhesive and the composition is not entirely aqueous based.

U.S. Pat. No. 4,179,415 issued Dec. 18, 1979, to Johnson and Johnson discloses a substantially aqueous based adhesive composition containing a latex having a high proportion of isoprene.

United Kingdom patent application 2097410A discloses novel pressure sensitive adhesives comprising a latex of a polymer and a tackifier resin the polymer being obtained from particular amounts of vinyl or vinylidene aromatic monomers and $C_4$-$C_8$ conjugated diene monomers and an unsaturated carboxylic acid. Similarly European patent application publication number 0062343 A2 discloses a latex of a copolymer obtained from a hard monomer such as styrene, a soft monomer such as butadiene and an unsaturated acid which may be blended with a tackifying resin to produce a formulation useful as a pressure sensitive adhesive.

Various resinous materials have been suggested as tackifier for these latices. Examples of materials suggested include emulsified rosin, partially decarboxylated rosin, glyceryl esters of polymerised rosin, partially dimerised rosin, natural resins, hydrogenated wood rosin, plasticised hydrogenated rosin, aliphatic hydrocarbon resins from petroleum, aromatic petroleum resins, EVA, terpene/phenol resins, cumarone/indene resins, rosin esters, pentaerythritol esters and polydicylopentadiene resins.

In developing adhesive formulations one seeks the optimum combination of several adhesive properties and since it is not generally possible to achieve the optimum for every property it is necessary to obtain the best balance of properties for the particular use in mind. For pressure sensitive adhesives for use in the label industry one tries to optimise the loop tack and ball tack and at the same time provide an adhesive whose component will not migrate during storage leading to unsightly coloring and lowering of adhesive properties. Although the improved loop tack and ball tack can be provided by the tackifier resins of the type described above we have found that those tackifier which provide such tack for example hydrogenated rosins such as Staybelite ester 10 and modified rosins such as Snowtack 52CF tend to migrate.

It has been generally suggested in United Kingdom patent application 2097410A and European Patent application 0062343 that petroleum hydrocarbon resins such as those manufactured from a $C_9$ cut of an aromatic hydrocarbon stream or a $C_5$ cut of an aliphatic or cycloaliphatic hydrocarbon stream are useful as tackifiers. There is however no suggestion of the particular type of resin that should be used and indeed many of the resins falling within such broad descriptions are unsuitable for tackification of lattices.

Our European Patent Application 85302057.6 describes lattices of resins having a softening point from 10° C. to 80° C. which are copolymers of a feed which is predominantly $C_5$ olefines and diolefines and one or more monovinyl aromatic compounds which contain from 10 to 30 wt. % of the monovinyl aromatic compound and their use as tackifiers for carboxylated styrene butadiene copolymer rubbers. We have now found that this type of copolymer is useful to tackify the polyacrylate emulsions frequently used in aqueous based adhesives.

SUMMARY OF THE INVENTION

The present invention therefore provides the use as a tackifier for an acrylic polymer or copolymer of a resin having a softening point from 10° C. to 120° C. preferably 10° to 80° C. being a copolymer of a feed which is predominantly C₅ olefines an diolefines and one or more monovinyl aromatic compounds containing from 10 to 60 wt. % preferably to 10 to 30 wt. % of the monovinyl aromatic compounds.

The invention further provides a pressure sensitive adhesive comprising from 30% to 85% by weight of an acrylic polymer or copolymer and from 15% to 70% by weight of a resin having a softening point from 10° C. to 120° C. preferably 10° C. to 80° C. being a copolymer of a feed which is predominantly C₅ olefines and diolefines and one or more monovinyl aromatic compounds containing from 10 to 60 wt. % preferably 10 to 30 wt. % of the monovinyl aromatic compounds.

BRIEF DESCRIPTION OF THE DRAWINGS

FIG. 1 is a graph of peel strength in Newtons/in., plotted against weight % resin in adhesive.

FIG. 2 is a graph of Loop Tack in Newton/in., plotted against weight % resin in adhesive.

FIG. 3 is a graph of Shear shown in log hours, plotted against weight % resin in adhesive.

FIG. 4 is a graph of peel strength in Newtons/in., plotted against weight % resin in adhesive.

FIG. 5 is a graph of Loop Tack in Newton/in., plotted against weight % resin in adhesive.

FIG. 6 is a graph of Shear shown in log hours, plotted against weight % resin in adhesive.

DETAILED DESCRIPTION OF THE INVENTION

Figure 1:
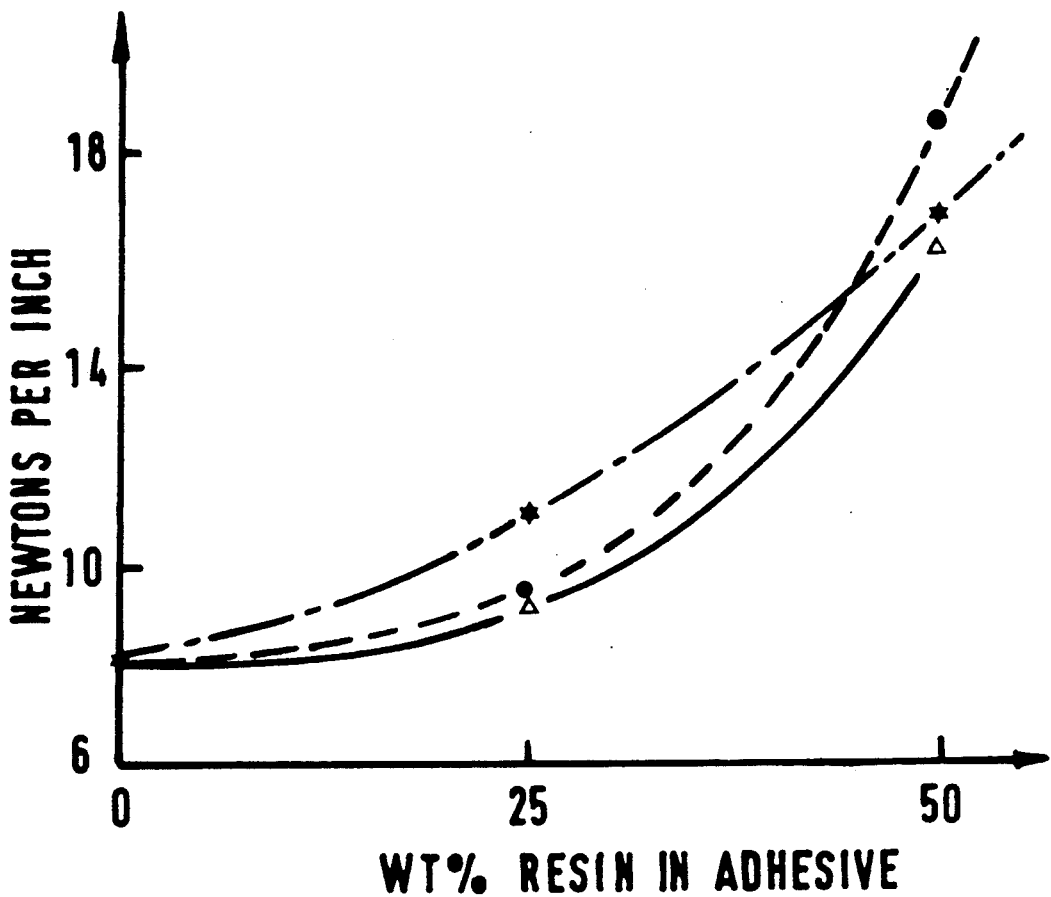
FIGS. 1-3 relate to adhesives containing resin and Acronal 85D.

The resins used as tackifier according to the present invention are prepared by the polymerisation of a mixture of a petroleum cracked distillate generally boiling in the range 25° C. to 80° C. and a monovinyl aromatic monomer in the proportions to yield a resin containing from 10 to 60 wt. % preferably 10 to 40 wt. % more preferably 10 to 30 wt. % of the monovinyl aromatic compound as determined by Nuclear Magnetic Resonance analysis. The petroleum cracked distillation comprises a mixture of saturated and unsaturated monomers the unsaturated monomers being mono-olefines and diolefines and although the unsaturated materials are predominantly C₅ some higher and lower materials such as C₆ olefines and diolefines may be present. The distillate may also contain saturated hydrocarbons including aromatics which can act as polymerisation solvent.

The preferred monovinyl aromatic monomer is styrene which may be substituted in the aromatic group. Alternatively α, methyl styrene or vinyl toluene may be used. It is preferred to use the pure monomer rather than the commercially available mixtures of vinyl aromatic monomers.

The resins are conveniently prepared by Friedel-Crafts catalysed polymerisation in which the mixture of cracked distillate and monovinyl aromatic monomer are treated with 0.25-2.5 wt. % of a catalyst such as aluminum chloride, aluminum bromide, or solutions, slurries or complexes thereof or borontrifluoride. These reactions are generally carried out at temperatures in the range 0° to 120° C., preferably 0° to 70° C. more preferably 20° to 55° C. the conditions being controlled to yield a resin of the required softening point. Residual catalyst is quenched by suitable methods such as addition of methyl alcohol and subsequent filtration followed by water and/or caustic washing. The final solution may then be stripped of unreacted hydrocarbons and low molecular weight oils by vacuum or steam distillation.

The resins contain from 10 to 60, preferably 10 to 40 more preferably 10 to 30 wt. % of the monovinyl aromatic monomer, most preferably from 15 to 25 wt. % and have a softening point from 10° C. to 120° C., preferably 10° C. to 80° C. The optimum softening point depends on the nature of the acrylic polymer or copolymer latex with which it is to be used but we prefer it be in the range 30° C. to 95° C. since at higher softening points the adhesive properties can deteriorate whilst use of lower softening point materials can result in migration of the tackifier. The resins are conveniently supplied as aqueous emulsions and the emulsions may readily be produced by mixing with water and an anionic or nonionic emulsifier or a mixture of both and obtaining the emulsion by inversion. We prefer that the emulsion contain about 50 wt. % of the resin. The emulsions may conveniently be obtained by the process described in our European Patent Application 83300001.1, Publication Number 0085471.

The acrylic polymer generally int eh form of a latex and the tackifier may be blended using conventional blenders to provide a homogeneous mixture. The tackifier resin may be added to the latex in an amount of from about 20 to about 100 parts by weight per hundred parts of polymer in the latex, more, preferably the tackifier resin is added to the latex in an amount from about 50 to about 150 parts by weight per 100 parts of polymer in the latex. It is preferred that the tackifier be added to the latex as an aqueous emulsion to provide the amounts of tackifier resin per amount of polymer given above. The acrylic polymer may be any of those traditionally used in the adhesives industry such as the "Acronal" (Registered Trade Mark) products marketed by BASF. Acronal ® is described by a product brochure from BASF, Ludwigshafen Germany, as "Acronal ® polymer derived from acrylates," more specifically "acrylic homopolymers and copolymers; dispersions for building adhesion, pressure sensitive adhesives, packing adhesives and sealants."

The adhesive compositions of the present invention may be applied to a substrate and then dried using conventional substrates and procedures. The substrate used depends upon the use envisaged but it is usually relatively thin material, usually no greater than about 3.2 mm in thickness and in the manufacture of tapes and labels the substrate is generally in sheet form. The sheet may be a polymeric material which is flexible at room temperature and may be a homo-polymer of an ethylenically unsaturated monomer such as ethylene, propylene or vinyl chloride, or be polyester or polyamide provided it has sufficient flexibility for the desired end use. Alternatively the substrate may be made from cellulosic or reconstituted cellulosic material such as rayon. The substrate need not be a sheet material but may be composed of fibers which may be woven, or non woven as in paper. Woven substrates may be made from cellulosic material, such as cotton or from fibers of any of the above mentioned polymers. The composition is applied to the substrate using conventional coating techniques such as roller coaters, blade coaters, meyer rods or air coaters. The coated substrate is then dried usually by passing it through a heating tunnel or oven through which may be circulation hot air or the tunnel or oven may contain infrared lamps to dry the coated substrate. The drying time will be a function of a number of factors such as the heat capacity of the substrate, the type of heating, the oven temperature, air velocities (if circulating air is used) and the rate of passage of the substrate through the heater.

The substrate should be coated with sufficient composition to provide a dry coat weight form about 16 to about 57 g/cm². Generally in the manufacture of tapes using a continuous sheet polymeric substrate a dry coat weight of about 15-30 g/m² is used. In the manufacture of labels a dry coat weight from about 15 to 30 g/cm² is usually used. In the manufacture of masking tape a dry coat weight from about 35 to about 654 g/cm² is usually used.

After drying the coated substrate is cut to the required dimension. In the manufacture of tape the substrate is cut into strips and rolled to provide a finished product. The substrate may also be cut into shaped items to provide labels or medicinal tapes.

The invention is illustrated by the following Examples in which the feed used to produce the resin tackifier had the following composition.

| Component (Wt. %) | |
|---|---|
| C₅ paraffin | 1 |
| C₅ olefins | 28.9 |
| C₆ paraffins | 3 |
| C₆ olefins | 5 |
| Isoprene | 17 |
| Pentadienes | 14.1 |
| CPD | 2.2 |
| Aromatics | 30 |

This feed was copolymerised with varying amounts of a C₅ olefin stream and styrene using 0.85 wt. % of an aluminum trichloride catalyst at a temperature of 40° C. The feed and catalyst were added to the reactor over 45 minutes and left for a further 15 minutes, after polymerisation the materials were hydrolysed, then neutralised with ammonium hydroxide, and stripped to remove volatiles.

The C₅ olefin stream used had the following compositions

| | |
|---|---|
| 3-Me-butene-1 | 0.3 |
| Pentadiene 1.4 | 0.1 |
| i-Pentane | 0.7 |
| Pentene-1 | 1.6 |
| 2-Me-butene-1 | 3.7 |
| Isoprene | 0.3 |
| N-pentane | 4.7 |
| Pentene-2 trans | 15.4 |
| Pentene-2 cis | 5.4 |
| 2-Me-butene-2 | 15.7 |
| Pentadiene-1.3 tris & trans | 0.3 |
| CPD | 1.0 |
| Cyclopentene | 12.2 |
| Cyclopentane | 11.9 |
| Aromatics | 4.0 |

The properties of the feeds used and the properties of the resins obtained are shown in the following Table.

| Feed Composition | Resin | | | | | | |
|---|---|---|---|---|---|---|---|
| | 1 | 2 | 3 | 4 | 5 | 6 | 7 |
| Styrene: (wt. %) | 8.6 | 8.6 | 14.3 | 20 | 27.3 | 18.2 | 33 |
| α-Me-styrene (wt. %) | — | — | — | — | — | 9.1 | — |
| Feed | 30.4 | 30.4 | 28.6 | 26.7 | 24.2 | 24.2 | 22.2 |
| C₅ stream (wt. %) | 61 | 61 | 57.1 | 53.3 | 48.5 | 48.5 | 44.8 |
| Resin yield (%) | 38 | 30 | 39 | 45 | 55 | 54 | 62 |
| Softening point (°C.) | 33 | 50 | 31 | 38 | 40 | 30 | 40 |
| Styrene in resin (% wt.) | 20 | 20 | 30 | 40 | 43 | 45 | 50 |

Example 2 was stripped using steam

The resins were emulsified in an equal weight of water by the process of European Patent Application 83300001.1 using 5.5 parts of the commercially available emulsifier Atlox 3404FB and their properties as tackifiers for polyacrylate emulsions commercially available for water based pressure sensitive adhesives were determined by mixing the resin emulsion and the latices commercially available from BASF as ACRONSAL 80 D and ACRONAL 85D and ACRONAL V205 to give a mixture combining equal amounts of resins and polyacrylates on a dry basis. The mixture was coated onto Mylar film to give a covering of 25 grams/square meter and the 180° peel strength, loop tack on metal and glass and the ball tack were measured as well as the shear on metal and the results compared with systems containing the commercially available tackifier the modified resins known as Snowtack 52 CF.

The results obtained with Acronal 80D were as follows:

| | RESIN | | | | | | | Snow Tack |
|---|---|---|---|---|---|---|---|---|
| | 1 | 2 | 3 | 4 | 5 | 6 | 7 | 52CF |
| Peel Strength Newtons/in | 9.9 | 10.9 | 10.7 | 11.6 | 8.9 | 10.1 | 9.5 | 12.5 |
| Loop tack Newtons/in | 8.2 | 8.8 | 8.8 | 10.3 | 7.5 | 6.5 | 8 | 9.3 |
| Shear (Hours) | 10.5 | 10 | 7.5 | 9.7 | 18.7 | 6 | 8.7 | 7.5 |

Figure 2:
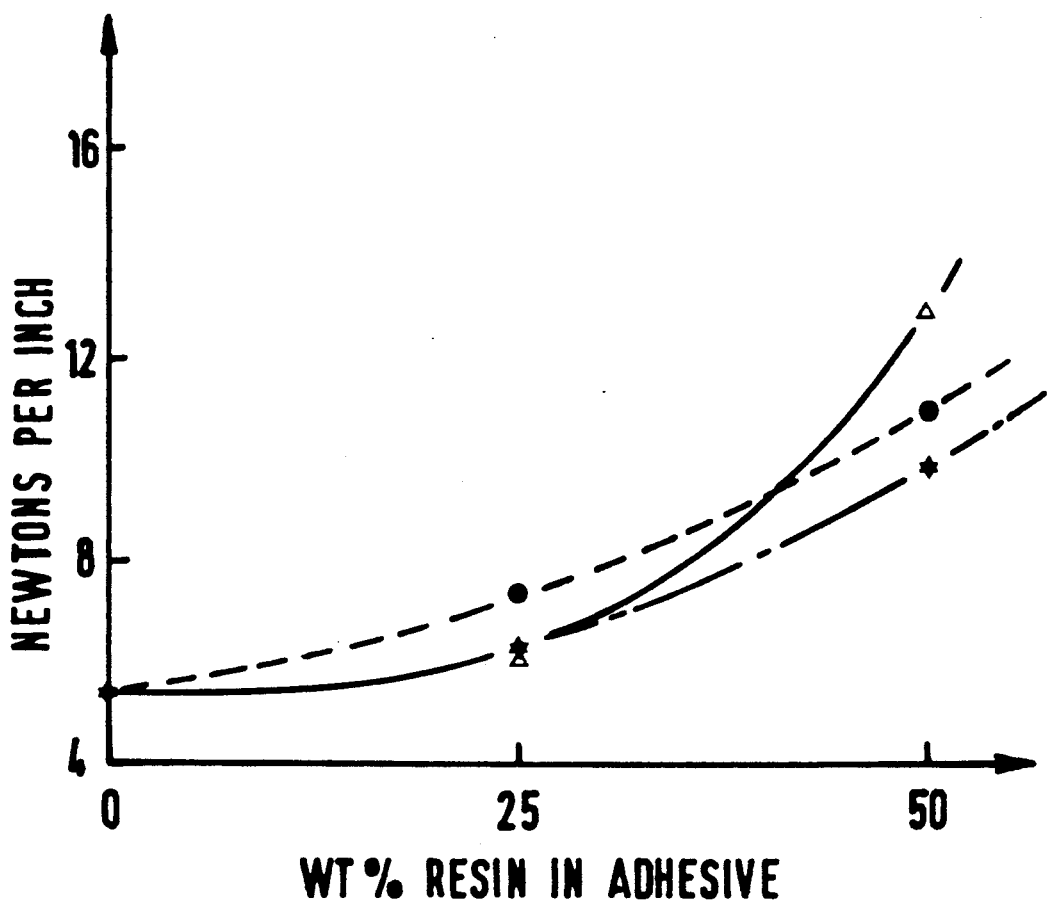
Figure 3:
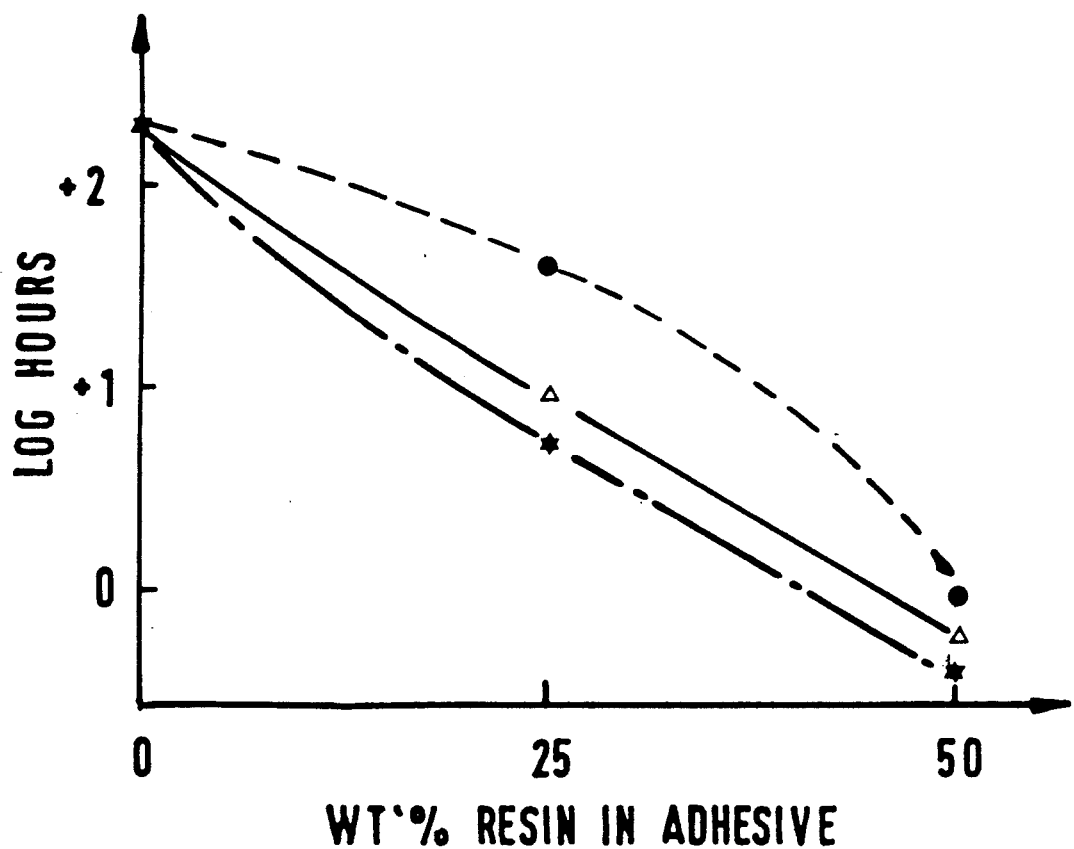
Figure 4:
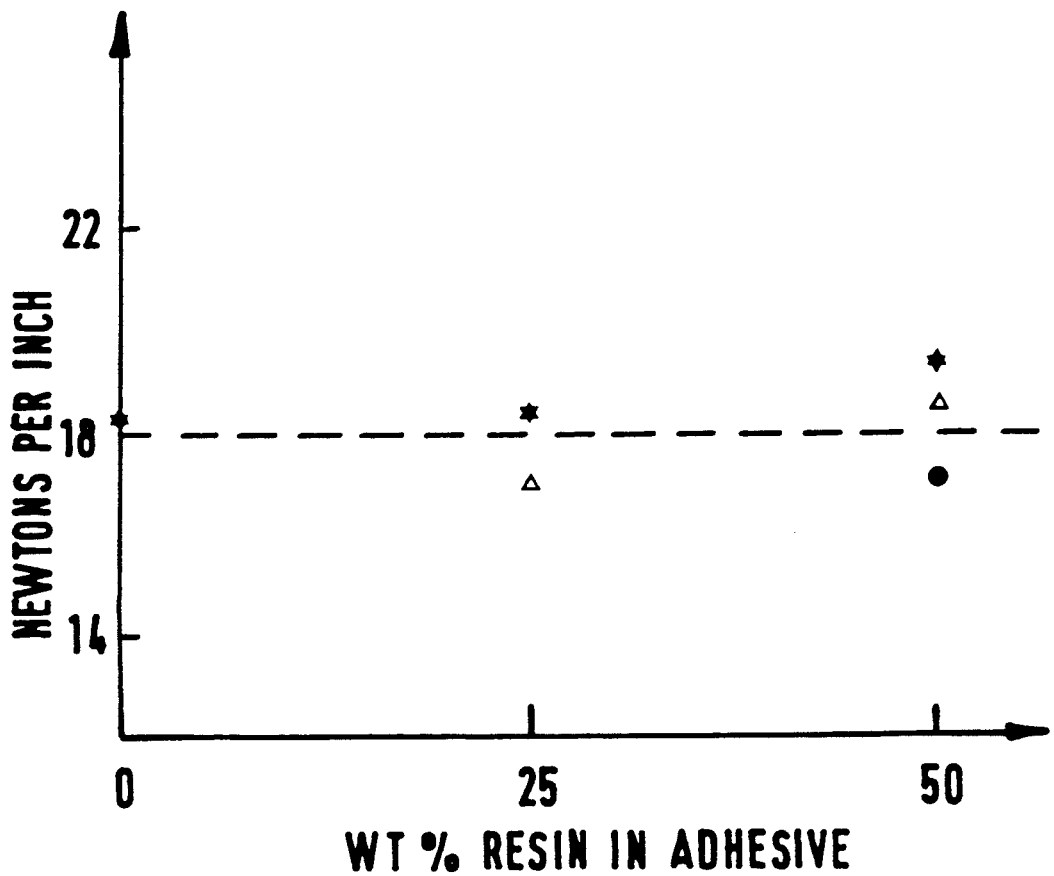
FIGS. 4-6 relate to adhesives containing resin and Acronal V205.
Figure 5:
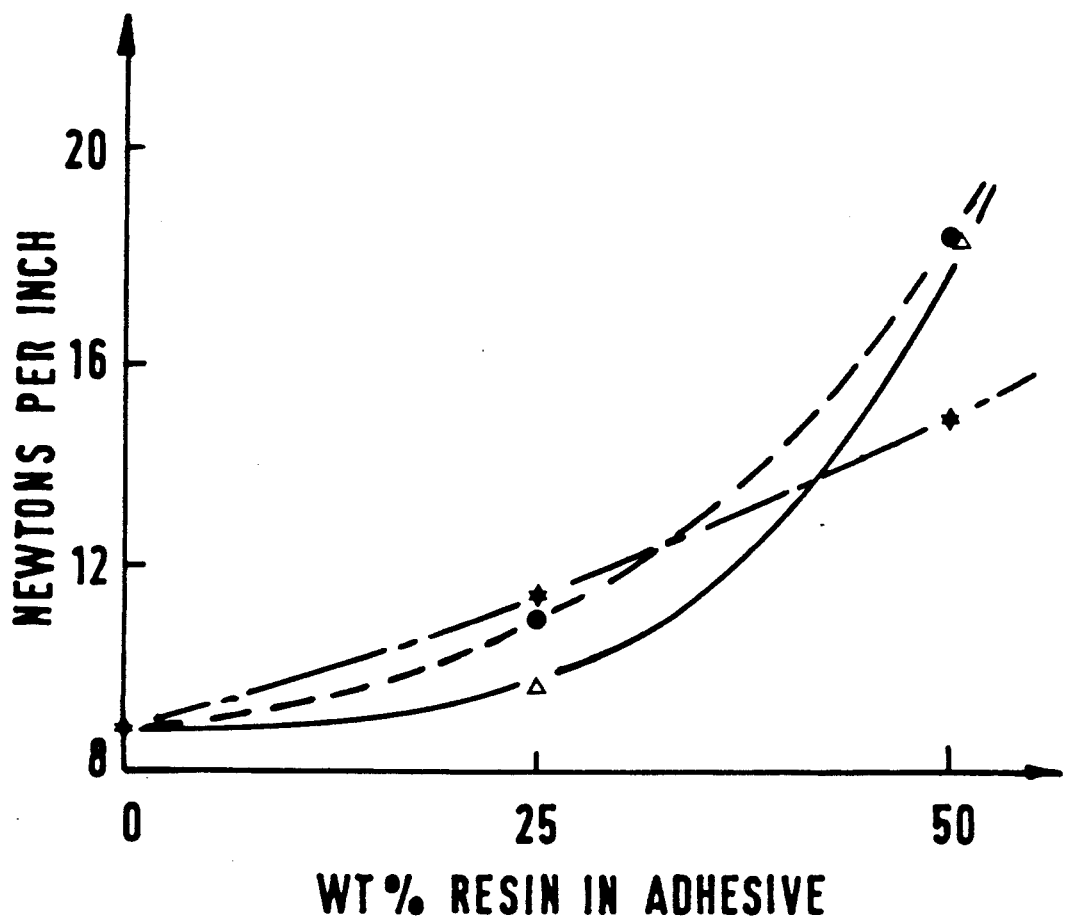
Figure 6:
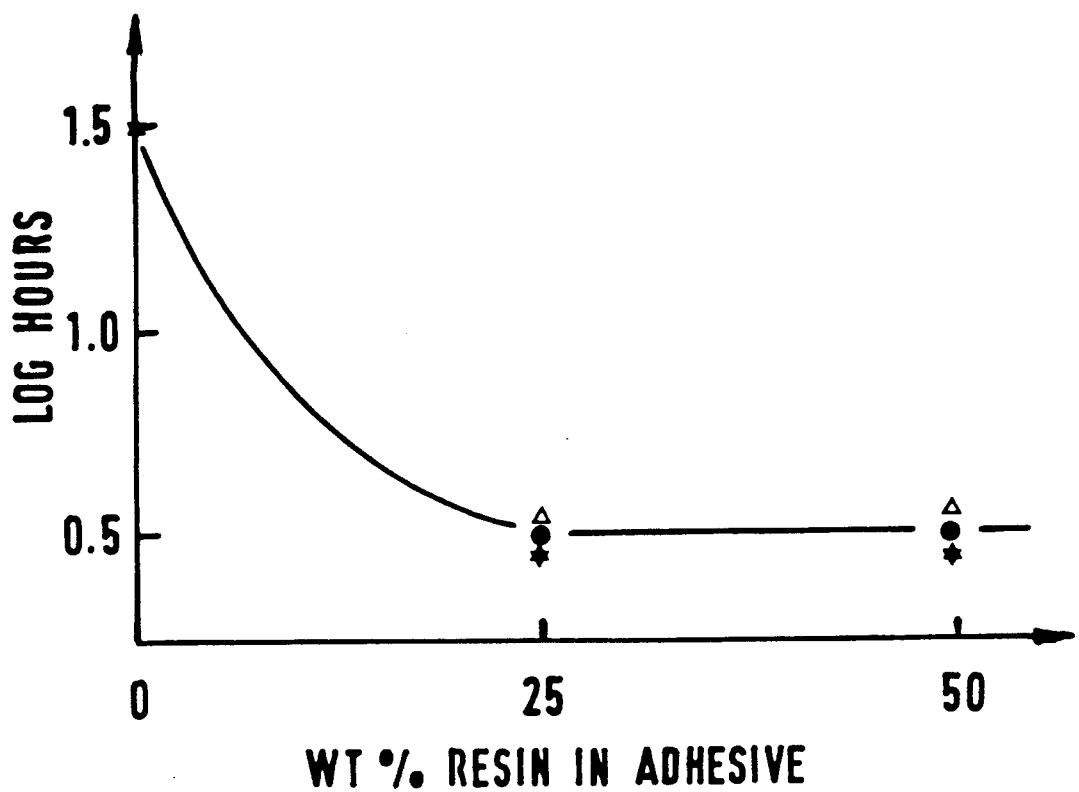

The peel strength, Loop Tack and Shear of Adhesives obtained from equal parts of an Snowtack 52 CF and emulsions of Acronal 85D and V205 D were measured at varying resin concentrations and the values obtained are set out in the graphs which are FIGS. 1 to 6 hereto in which the wt. % resin is on a dry basis in relation to the total weight of polymer and resin.

The following further resins were prepared using the feeds previously described.

| Feed composition wt. % | RESIN NUMBER | | |
|---|---|---|---|
| | 8 | 9 | 10 |
| Styrene | 17.7 | 8.9 | 11.7 |
| Feed | 42.1 | 53.7 | 52.1 |
| C5 stream | 40.2 | 37.4 | 36.2 |
| Resin yield % | 46 | 26.1 | 47.3 |
| Softening Point °C. | 77 | 26 | 75 |
| Styrene in Resin (% wt.) | 35 | 9 | 22 |

All the resins were steam stripped.

The resins were evaluated as tackifiers for acrylic emulsion in mixtures containing 100 parts by weight acrylic and 20 parts by weight resin on a dry weight basis.

The results were as follows:

| Acrylic Emulsion | ACRONAL V205 | | | ACRONAL 85D* | | |
|---|---|---|---|---|---|---|
| Emulsion of Resin | 8 | 9 | 10 | 8 | 9 | 10 |
| Peel (N/Inch) | 20 | 17 | 20 | 9.9 | 8.8 | 8.8 |
| Loop Tack (N/Inch) | 1.5 | 12 | 11 | 1.5 | 6.5 | 7.8 |
| Ball Tack (cm) | 4.5 | 11 | 4.5 | 10 | 18 | 14 |
| Shear (Hrs) | 1 | 0.8 | 0.5 | >300 | 83 | 200 |

*Acronal 85D is an anionic, plasticizer-free aqueous dispersion of an acrylic copolymer (with free carboxy groups) produced with incorporation of acrylonitrile. This dispersion is of small particle size.

We claim:

1. A pressure sensitive adhesive polyacrylate latex emulsion comprising form 30% to 85% by weight on a dry basis of a polyacrylate and from 15% to 70% by weight on a dry basis of a tackifier resin having a softening point from 10° C. to 120° C. and being a copolymer of a feed which is predominantly $C_5$ olefins and diolefins and one or more monovinyl aromatic compounds, said resin containing from 10 to 60 wt. % of the monovinyl aromatic compound.

2. A pressure sensitive adhesive according to claim 1 in which the tackifier resin has a softening point from 10° C. to 80° C. and contains from 10 to 60 wt. % of the monovinyl aromatic compound.

3. A pressure sensitive adhesive according to claim 1 in which the resin contains from 10 to 25 wt. % of the monovinyl aromatic compound.

4. A pressure sensitive adhesive according to claim 1 in which the monovinyl aromatic compound is styrene.

* * * * *